United States Patent [19]

Hachtel et al.

[11] Patent Number: 4,574,237
[45] Date of Patent: Mar. 4, 1986

[54] ROTARY SPEED MEASURING APPARATUS

[75] Inventors: Hansjörg Hachtel, Weissach; Klaus Dobler, Gerlingen, both of Fed. Rep. of Germany

[73] Assignee: Robert Bosch GmbH, Stuttgart, Fed. Rep. of Germany

[21] Appl. No.: 534,301

[22] Filed: Sep. 21, 1983

[30] Foreign Application Priority Data

Nov. 13, 1982 [DE] Fed. Rep. of Germany ....... 3242109

[51] Int. Cl.$^4$ ............................ G01P 3/48; G01P 3/54
[52] U.S. Cl. ..................................... 324/173; 324/164
[58] Field of Search ............... 324/173, 174, 164, 166, 324/208

[56] References Cited

U.S. PATENT DOCUMENTS

| | | | |
|---|---|---|---|
| 3,132,337 | 5/1964 | Martin | 324/174 X |
| 3,134,918 | 5/1964 | Eichenberger et al. | 324/174 X |
| 3,281,825 | 10/1966 | Corl et al. | 324/173 X |

OTHER PUBLICATIONS

Lagergren et al., Integral Emitter & Handwheel, IBM Technical Disclosure Bulletin, Apr. 1971, p. 3339.

*Primary Examiner*—Stanley T. Krawczewicz
*Attorney, Agent, or Firm*—Frishauf, Holtz, Goodman & Woodward

[57] ABSTRACT

A coil sensor excited with alternating current and connected in a circuit for detecting changes in the coil impedance producing a signal exceeding a fixed threshold value in response to the revolution of a wheel with features providing periodic changes in the spacing between the coil and the wheel, has its periphery subdivided into zones where the surface material is alternately thereomagnetic and non-theromagnetic. With a suitable setting of the frequency of the exciting alternating current and a suitable choice of the materials with respect to their eddy current and magnetic induction effect on the inductance of the coil, it is possible to suppress the signal of once per revolution periodicity resulting from wheel eccentricity, bearing wobble or the like.

4 Claims, 15 Drawing Figures

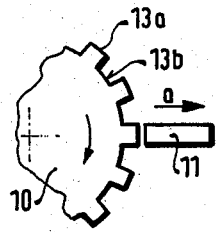
FIG. 3α
PRIOR ART
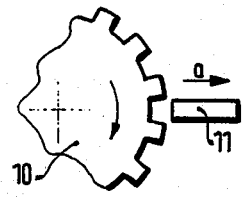
FIG. 3β
PRIOR ART
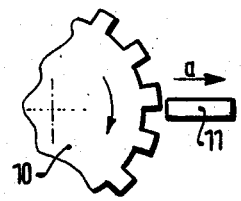
FIG. 3γ
PRIOR ART
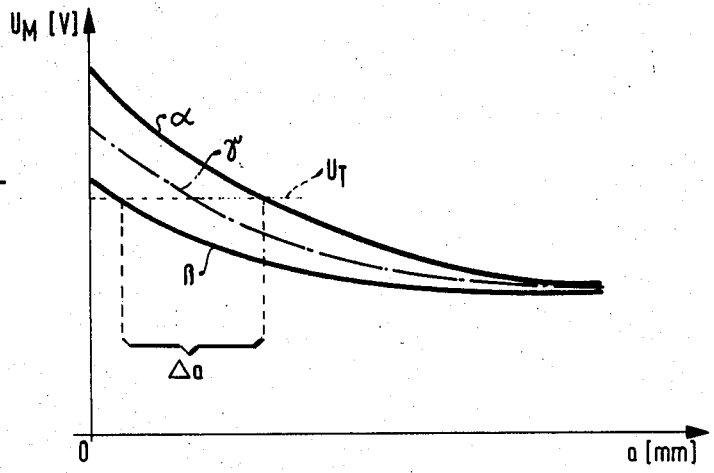
FIG. 4
PRIOR ART
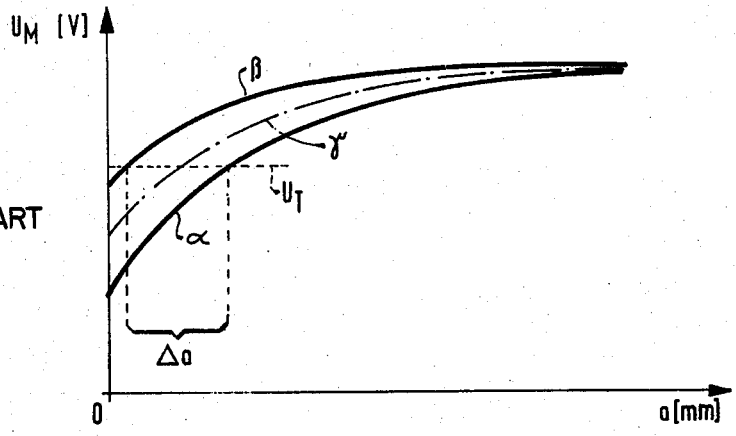
FIG. 5
PRIOR ART FIG.6δ    FIG.6ε    FIG.6φ
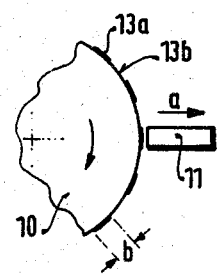 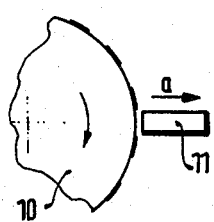 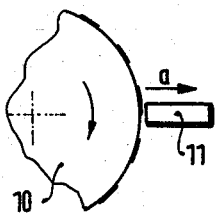
FIG.7
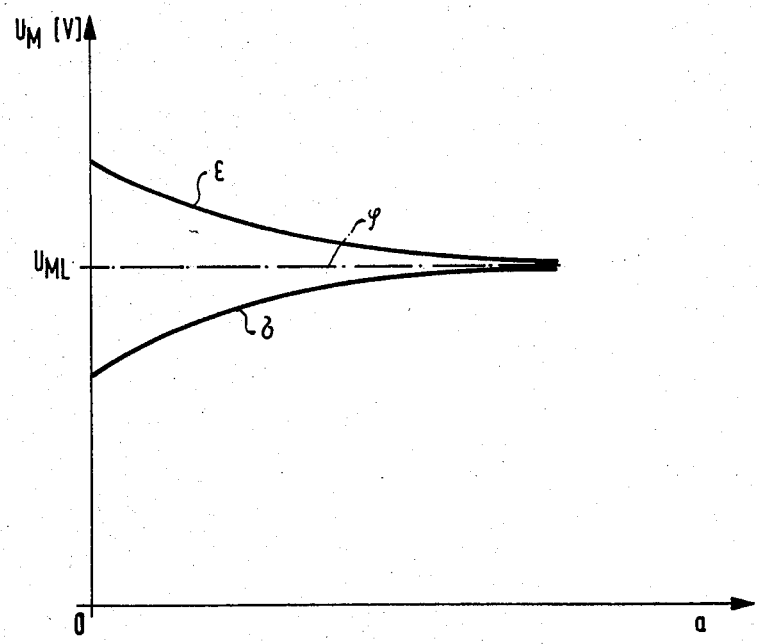

ROTARY SPEED MEASURING APPARATUS

This invention concerns instrumentation for measuring the speed of a revolving body such as an engine shaft by an inductive and eddy current method by means of a measuring wheel driven in step with the revolving body and a coil nearby excited with alternating currents of a certain frequency. Change in the inductance of the coil in step with periodic detail features of the wheel produces a signal that is evaluated in electrical circuits.

Apparatus of the kind just described is known in which the measuring wheel is a toothed wheel. The marking features of the wheel which produce changes in the coil's inductance are in this case the teeth of the wheel and the gaps between them, features consisting of uniform material, either theromagnetic or non-ferromagnetic (diamagnetic or paramagnetic) but nevertheless electrically conducting. According to what kind of material is used, either the magnetostatic effect and the eddy current effect are utilized in the measurement or else only the eddy current effect.

Since both effects diminish with increasing spacing between coil and toothed wheel, what is picked up by the coil and provided in the signal is not only the count of passing teeth but also any noncircular rotation of the wheel which may be caused by bearing play, shaft bending or mounting of the wheel on its shaft in a plane deviating from perpendicularity to the shaft. A measuring signal is then obtained at the coil in which the tooth count is superposed on the first order of the speed. In the presence of noncircular rotation of the toothed wheel this signal is unsuitable for further processing, because in this case a circuit responding at a particular threshold voltage does not detect the passage of all of the teeth.

SUMMARY OF THE INVENTION

It is an object of the invention to provide rotary speed measurement apparatus which even in the presence of noncircular measuring wheel rotation provides a pulse sequence at the output of the evaluation circuit having a frequency corresponding exactly to the succession frequency of the teeth or other periodically disposed markers on the wheel. In other words, all of the markings should be detected independently of noncircular or eccentric wheel rotation.

BRIEF DESCRIPTION OF THE DRAWINGS

The invention is further described by way of illustrative example with reference to the annexed drawings, in which:

FIG. 3α, and FIG. 3β, FIG. 3γ show the device of FIG. 1 respectively for three different positions of the toothed wheel relative to the coil.

FIG. 4 is a graph of voltage against spacing between coil and wheel for the signal in the three illustrated positions of the wheel relative to the coil of FIG. 1 for the case in which the material of the toothed wheel and the frequency of the alternating current are so chosen that the measurement signal has only a small eddy current component (essentially inductive measurement method);

FIG. 5 is a graph like FIG. 4 for the case in which the material of the toothed wheel is so chosen that the measurement signal has no inductive component (pure eddy current method);

FIGS. 6δ, 6ε, and 6φ respectively show measurement apparatus according to the invention in three positions respectively corresponding to the positions of the apparatus of FIG. 1 in FIGS. 3α, 3β, and 3γ;

FIG. 7 is a graph of voltage plotted against spacing between coil and wheel for the three apparatus positions respectively illustrated in FIGS. 6Δ, 6ε and 6φ;

DESCRIPTION OF THE PREFERRED EMBODIMENTS

Figure 1:
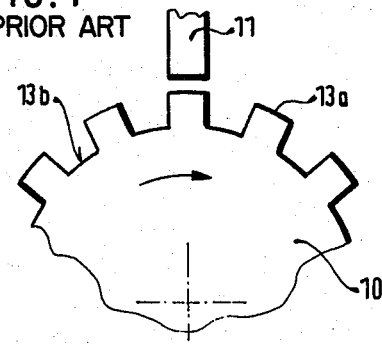
FIG. 1 shows schematically and in part a diagram of a known speed-measuring device utilizing a toothed wheel and a coil.

Sensors for determining rotary speed or position are finding an increasing number of applications in the control and regulation of machinery. Toothed disk wheels like the wheel 10 of FIG. 1 are commonly used with suitable transducers in rotary machine equipment. Contactless (passive) methods of rotary speed measurement are known and often preferred. In these measurement methods the different spacing from the coil of a tooth and of the wheel periphery in a gap between teeth is used as the measurement effect (see FIGS. 3α, 3β and 3γ).

Figure 2A:
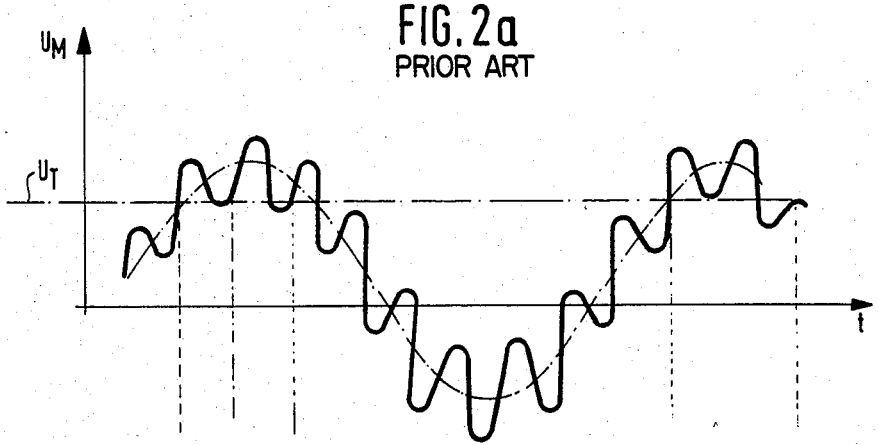
FIG. 2a is a graph of a measurement signal $U_M$ in the presence of noncircular toothed wheel rotation.
Figure 2B:
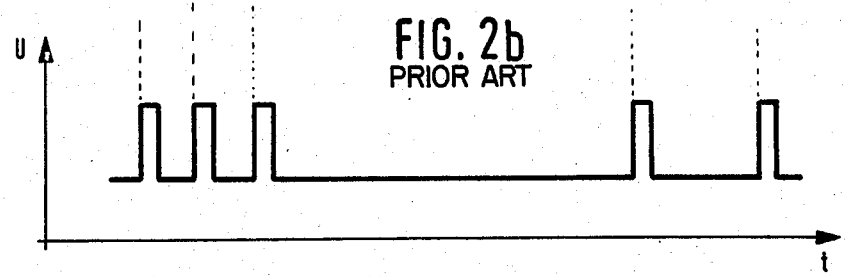
FIG. 2b is a graph on the same time scale as that of FIG. 2a showing the output of a Schmitt trigger circuit to which an input signal corresponding to FIG. 2a is supplied.

Since what is involved is primarily a spacing measurement, the noncircular rotary displacement of tooth wheel is picked up along with the tooth count, the former being caused, for example, by play in the bearings, shaft bending or non-perpendicular attitude of the toothed wheel on its shaft. A varying measured voltage is thereby obtained in which the tooth count signal is superposed on the first order (one cycle per revolution) of the rotary speed, as shown in FIG. 2a. This composite signal is unsuitable for further processing to derive a pulse output because the following evaluation circuit, that may, for example, contain a Schmitt trigger circuit, would not respond to all the teeth, as FIG. 2b shows.

The apparatus constituted according to the invention further described below, makes possible so great a degree of suppression of the first order signal in the measurement indication that all of the teeth can be registered by a simple threshold type evaluation circuit.

Figure 8A:
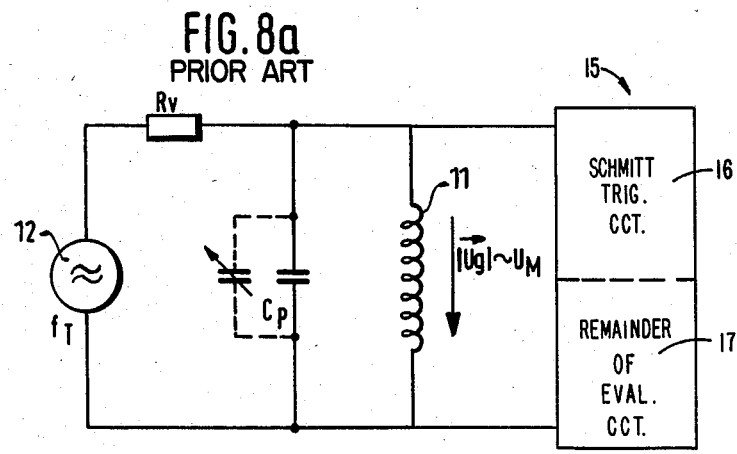
FIG. 8a is a circuit diagram of an electrical circuit for the sensor coil.

In the known contactless electrical induction or eddy current methods of measurement using toothed wheels or the like, an alternating current with the carrier frequency $f_T$ produced by a generator 12 fl a sensor coil 11 (FIG. 8a). Since the voltage drop $\vec{U}_g$ there appearing is utilized to obtain a measurement signal, the magnitude of the apparent resistance (impedance) of the coil 11 determines the peak magnitude of the measured voltage $U_M$. The voltage $U_M$ is utilized by an evaluation circuit 15 which which typically uses a Schmitt trigger circuit 16 as threshold circuit. The remainder 17 of the evaluation circuit 15 responds to the repeated outputs of the threshold circuit in the usual way, in addition to setting the threshold voltage $U_T$ for the Schmitt trigger circuit. The following relations then results.

If the measured object (wheel) 10 consists of ferromagnetic material (e.g. St 37.11), two effects determine the inductance of the coil 11. The magnetostatic effect produces an increase of inductance of the coil 11 when the measured object 10 approaches nearer to the coil 11, while the eddy current effect, on the other hand, then produces a diminution of inductance; the two effects thus work against each other. With increasing fervency $f_T$, as is known, the eddy current effect increases, while the permeability diminishes. In the case of ferromagnetic steels ( at relatively low frequencies for $f_T$) the magnetostatic influence clearly predominates for the reason just given; the inductance of the coil 11 therefore increases with the approach of the measured object 10. If a measured object 10, on the contrary, consists of non-ferromagnetic material (for example nonferrous metal), only the eddy current effect is present insofar as the surfaces of this material are electrically conductive. The inductance of the coil 11 therefore diminishes with approach of the object 10.

The following considerations are based on the assumption that the coil 11 is so wound that for a carrier frequency $f_{TM}$, the inductance of the coil 11 is the predominant component of the impedance $\vec{Z}_g$ of the coil; $\vec{Z}_g$ accordingly tends to change in a manner corresponding to the coil inductance.

If the inductive method of measurement, as preferred, is used, the toothed wheel 10 consists of ferromagnetic material and the frequency $f_{TM}$ is relatively low, in which case the relations described below result. It is to be understood in this case that the coil impedance $\vec{Z}_g$ and the measurement voltage $U_M$ change in the same sense, which can be made the case by a corresponding design of the electrical evaluation circuit.

1. FIG. 3α: Coil 11 Opposite Tooth Crown 13a.

In accordance with the above-described relationships the measured voltage $U_M$, determined by the magnetostatic effect, is greatest for the spacing 0 mm. This is evident from the diagram of FIG. 4. In that diagram the measurement voltage $U_M$ (α curve) is plotted against the spacing a between the coil and the toothed wheel, beginning from the spacing 0 mm (left end of the diagram). It is plainly visible that with increasing distance a the measured voltage $U_M$ becomes smaller, until at a sufficiently large spacing a constant value is approached (the sensor 11 then measures against "air", and the effective permeability no longer changes).

2. FIG. 3β: Coil 11 Opposite Gap 13b.

In the unrealizable ideal case of extreme further provision of teeth, the measurement voltage $U_M$ would always have the same constant value over the entire range of the spacing a, since the coil 11 always measures against air both for the spacing a = 0 mm, with reference to the tooth crowns (coil 11 measures opposite gap) and also with greater distance a. This is often not the case, however. The narrower the dentation is, with reference to the sensor coil diameter, the more that the electromagnetic fields going out from the coil 11 measure, at the spacing 0 mm, the tooth crowns, the tooth edges and/or the bottom of the intertooth gaps. The effective permeability is of course smaller then than in the case α, but nevertheless, greater than if the coil 11 was merely measuring against "air": the characteristic curve β runs somewhat flatter than the α curve, but it still has the same general characteristic.

3. FIG. 3γ: Coil 11 Opposite Tooth Crown 13a and Tooth Gap 13b

If the sensor 11 is in position between a tooth crown and a tooth gap, a characteristic curve results that tends to have the same characteristic (γ curve), but the height of which lies between the above-described α and β characteristic curves.

In eddy current effect measurements—at the same above-defined carrier frequency $f_{TM}$—the coil inductance and hence its impedance decrease with approach to each other of the coil and the tooth wheel. For this reason the measurement voltage characteristic curve, made by this method (FIG. 5) runs oppositely: the measurement voltages rise as the spacing a becomes greater. Similar measurement changes to those of the inductive method result, but with opposite sign: the more the sensor 11 produces eddy currents at a spacing a=0 mm, the stronger is the voltage increase as the distance a becomes greater, until at a sufficiently wide spacing its value becomes constant (air-core coil voltage drop). This can be seen by comparison of the α, β and γ characteristic curves of FIG. 5 with the corresponding relative positions of coil and toothed wheel shown in FIGS. 3α, 3β and 3γ.

If as the result of an out-of-round shape of the toothed disk 10, or a bad bearing or shaft bending, the spacing varies in a cycle corresponding to one revelution, both measurement methods are unsuitable for speed determination, because the constant trigger voltage $U_T$ of the Schmitt trigger circuit that is connected to the coil cannot detect all of the teeth. This can be recognized from FIGS. 4 and 5. With a prescribed constant trigger voltage $U_T$ of a certain height (dotted lines) in every case, both with the inductive method and with the eddy current method all of the teeth can be measured only if the spacing change is completed every time within the region Δa drawn in on the figures. If the spacing change drops out to a greater extent, all of the teeth are no longer detected. The invention now to be described consists in that the measuring wheel 10 is made of at least two different materials and the speed to be determined is measured with the same coil simultaneously with the inductive and the eddy current method, the oppositely working calibration curve being so correlated that the measuring wheel rotation can be correctly determined, independently of eccentricity, by reference to the trigger voltage $U_T$. The basic principle can be seen from the three FIGS. 6δ, 6ε and 6φ.

In the measuring wheel 10 metallic foils or surfaces 13a, which are applied over segments uniformly distributed on the circumference, take over the functions of the teeth, while the remaining uncovered parts 13b of the measuring wheel body take over the function of the intertooth gaps (or vice versa). It is critical in this case that the magnetic properties of the foil or layer material and the measuring wheel body should be different. A good measuring effect is obtained if as here described, for example, the foils 13a are made of nonferrous metals of good conductivity which has no ferromagnetism, while the measuring wheel body is made of ferromagnetic highly permeable material (for example magnetic ferrite).

If the sensor 11 is opposite the foil 13a (position in FIG. 6δ), the sensor 11 operates mainly in accordance with the eddy current principle, i.e. the measurement voltage $U_M$ rises with increasing spacing a ($\Delta$ curve, FIG. 7). In the position shown in FIG. 6$\epsilon$, the sensor 11 chiefly measures opposite ferromagnetic material 13$b$. The sensor 11 now detects the coil-wheel essentially in the inductive manner. That means that the measuring voltage $U_M$ diminishes as the distance a becomes greater ($\epsilon$ curve). In the position shown in FIG. 6$\phi$, the center coil 11 measures half opposite the magnetic region and half opposite the nonmagnetic region. With increase or diminution of the spacing a, oppositely working voltage changes more or less cancel each other out in their coil halves. There is obtained (in the ideal case) a measurement voltage $U_{ML}$ the height of which is approximately constant, independently of the spacing a.

Figure 9:
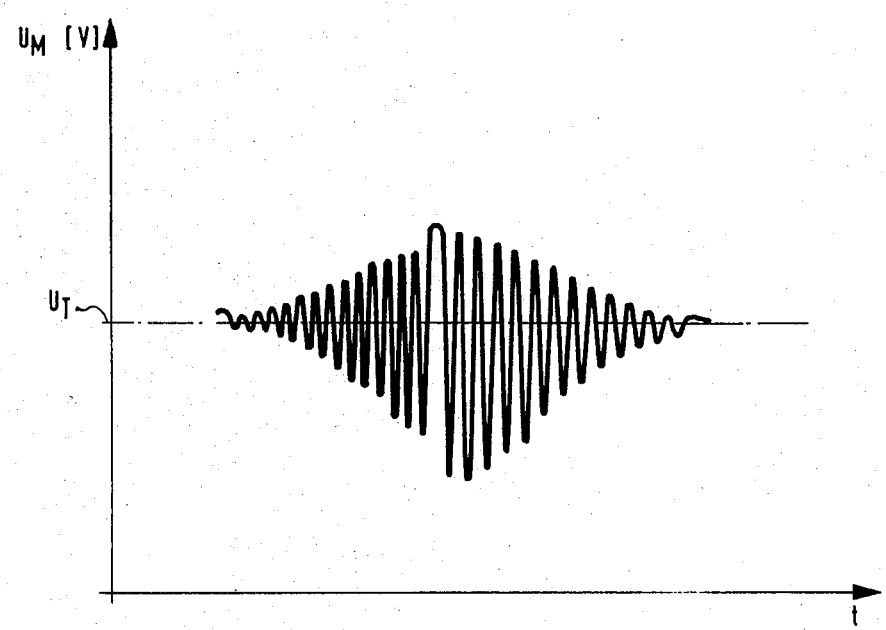
FIG. 9 is a graph plotting voltage against time for the case in which the measuring wheel is clamped in place with very considerable eccentricity.

It can be seen from the course of the curve above described that a constant trigger voltage $U_T$ that is about as high as $U_{ML}$ detects all of the foil segments 13$a$ and the uncovered parts 13$b$ in a speed measurement independently of the rotation eccentricity. FIG. 9 gives an impression of the capabilities of this measurement procedure and apparatus. The unamplified measurement voltage is shown there which is obtained when the measurement wheel 10 is clamped quite eccentrically (eccentricity 0.6 mm). The foil 13$a$ has a width b of 0.5 to 0.8 mm (FIG. 6), the keying ratio is 1:1, the sensor coil diameter is 1.4 mm. It is clearly recognizable that it is possible, with the constant trigger voltage $U_T$ to detect all the foil segments 13$a$ and the uncovered parts 13$b$, independently of the spacing a, down to the limit of resolution.

It is a requirement for the trouble-free operation of this measurement system for the $\epsilon$ ("inductive") and $\delta$ ("eddy current") characteristic curves (67) to run at least in accordance with opposite relations and it is best for them to run with something like symmetry in rough approximation. This can be obtained, in accordance with the invention, by adjusting or trimming the frequency $f_T$ of the alternating current (carrier frequency) which flows through the coil 11. It was already mentioned above that with increasing carrier frequency the inductive effect falls off in the case of magnetic materials, while at the same time the eddy current effect increases both with magnetic and nonmagnetic materials. It is also necessary to change the carrier frequency $f_T$ long enough for the above-described relations to be obtained and set. It is often useful in such cases to select the air core coil voltage drop $U_{ML}$ (sensor to toothed wheel spacing is very large) as a reference magnitude for the trigger voltage magnitude ($U_{ML}=U_T$). In order to obtain a sufficient voltage drop it may often be necessary to operate small sensor coils 11 with very high frequency alternating current.

Figure 8B:
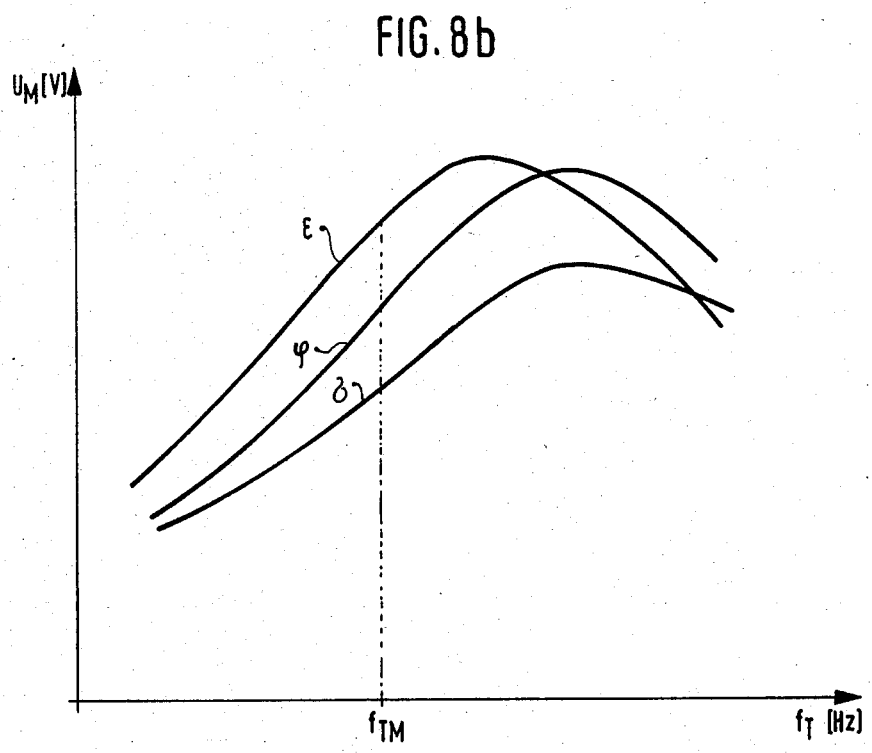
FIG. 8b is a graph plotting voltage against frequency for the apparatus according to the invention at a certain particular spacing between coil and toothed wheel, with a capacitance connected in parallel with the sensing coil.

The connection of a capacitance $C_P$ in parallel to the coil 11 (FIG. 8$a$), a capacitance that can actually be provided by the coil connection cable and/or a discrete capacitor, makes it possible to reduce the carrier frequency $f_{TM}$. In the diagram given in FIG. 8$b$, the characteristic course of the measurement voltage $U_M$ is plotted against the carrier frequency $f_T$ (for a constant basic spacing between the coil and the wheel). $\Delta$, $\epsilon$, $\phi$ describe the position of the sensor 11 with respect to the wheel 10 corresponding respectively to FIGS. 6$\delta$, 6$\epsilon$ and 6$\phi$. It can clearly be seen that in this case the contribution of the eddy current and inductive measurement effects to the measurement signal $U_M$ can be so influenced by the variation of the carrier frequency $f_T$ that the above-described optimum relations can be set ($f_{TM} \approx \ldots$).

It is often the case that as the result of cost considerations, however, an oscillator is present that generates merely a fixed permanently set carrier frequency (for example 2 MHz). It is then possible, in accordance with the invention to shift the resonances to such an extent that it is possible even with the prescribed frequency $f_{TM}$, to obtain the above-described optimum relations with reference to the suppression of the first order effects in the measurement indications. This can be done by means of a rotary capacitor that is connected either alone or supplementarily to a capacitor already present in parallel to the coil 11 (shown in dotted lines). If the speed measurement is to be made on mass-produced machines, compensation or callibration elements can be dispensed with if the individual sensor coils 11 are manufactured with such a degree of precision that they are interchangeable with each other.

If the capacitor is designed to be relatively large, it is then possible for an increase of the coil inductance to produce a drop of the measurement voltage at the coil, while an inductance diminution will produce a voltage increase, because the carrier frequency $f_{TM1}$ is then higher than the resonance frequency (8$b$). Even with this method of measurement the indication of the first order can be suppressed, because the $\delta$ curve and the $\delta$ curve have merely been interchanged in mirror image (FIG. 7).

By means of the speed measurement in accordance with the invention not only are the errors suppressed which are produced by unroundness of the measuring wheel rotation, but even those errors which could arise as a result of radial vibratory movements of the coil 11 can be mitigated or prevented. The coil 11 can, for example, be mounted on a chassis part which is connected by a spring suspension with the measuring wheel shaft.

In the measurement operation of the invention as described it is most effective for the measuring wheel 10 to be subdivided around its circumference segment by segment into zones 13$b$ of ferromagnetic material of a kind inhibiting the building up of eddy currents and zones 13$a$ of non-ferromagnetic material of good conductivity (for example copper or aluminum) favoring the building up of eddy currents. There are many materials and a great variety of construction possibilities for providing these conditions. For example it is possible to make the foils 13$a$ out of ferromagnetic material and the measuring wheel out of nontheromagnetic material. On the other hand it is, for example, possible to provide the measuring wheel body of synthetic material (e.g. of polyvinyl chloride, or materials available under the names Resitex or Plexiglas, etc.) and to glue a metallic foil on the circumferential surface used as the measuring surface which foil in itself is stripwise subdivided by the application of another metal, which is to say that it consists of strips which alternately contain different materials of the above-mentioned kinds and in this manner form the zones 13$a$ and 13$b$ that are operative to produce the measurements.

For segmental or strip-shaped application of a magnetic material on nonmagnetic material or otherwise, there are various possibilities such as adhesive fastening, evaporative deposition or application by electrochemical processes. There is further given below, by way of example, a few of the very many materials which have the required material properties.

TABLE 1

| Ferromagnetic Material of High Permeability (Partly of Good Eddy Current Suppression) | Non-ferromagnetic Material with Good Electric Conductivity |
| --- | --- |
| Fe | Anti-magnetic steel |
| Fe—Si alloy | Aluminum |
| Fe—Mi alloy | Copper |
| Mumetal | Brass |
| Ferrite | |
| Generator lamination of small thickness | |

Up to now instrument design had always proceeded from the basis that the sensor coil diameter d should be of the same size or (even more favorable) somewhat smaller than the segment width b (foil width b for approximate keying ratio 1:1- see FIG. 6δ, 6ε and 6φ). If the measuring wheel is subdivided into especially narrow sections 13a and 13b, however, it is usually unavoidable for the diameter d of the coil 11 to be made larger than the width b. In this case it is practical to constitute the sensor 11 in such a way that its outer diameter is approximately equal to an odd multiple of the segment width b (example: b=0.5 mm, d=1.5 mm). The sensor 11 now measures over three sections, so that in the extreme positions it covers either one or two foils (analagous to FIGS. 6δ and 6ε). The coil 11 in these positions then no longer measures the spacing a or the speed only by eddy current or by induction, but instead the eddy current or the inductive effect merely predominates in each case. In principle the same relations described above hold. There now never occurs a complete separation of the two kinds of measurement as a consequence of the edge zone of the electromagnetic alternating field. If the sensor 11 is partially covered by a metallic foil the same relations hold in an equivalent or an analagous fashion.

Although the invention has been described with reference to particular illustrative examples, it will be understood that variations and modifications are possible within the inventive concept.

We claim:

1. Apparatus for measuring rotary speed of a body by means of a measuring wheel (10) drivingly connected to said body and a coil (11) conducting an alternating electric current of a predetermined frequency ($f_{TM}$), said coil being disposed in the neighborhood of said wheel so as to provide a signal ($\vec{U_g}$) dependent upon the speed of said wheel, which signal is produced by the change of the inductance of said coil during the measurement, means being provided for evaluation of said signal by a circuit responding to a voltage reaching a predetermined threshold voltage ($U_T$), in which apparatus there is the improvement comprising:

periodically repetitive marking features (13a,13b) disposed in the circumferential direction of said wheel which comprise, within every period of the periodicity of the repetition of said marking features, at least one zone (13a or 13b) consisting of ferromagnetic material and at least one zone (13b or 13a) consisting of diamagnetic or paramagnetic but nevertheless electrically conducting material, and means for providing as said threshold voltage ($U_T$) a voltage approximately equal to the voltage ($U_{ML}$) that would be provided as said signal ($\vec{U_g}$) by said coil when said wheel is infinitely far therefrom, said ferromagntic material or said frequency ($f_{TM}$) both being so chosen that the magnetostatic effect is greater than the eddy current effect in said zones consisting of ferromagnetic material.

2. Apparatus according to claim 1, in which said zones (13a,13b) of said ferromagnetic material and said zones of said diamagnetic or paramagnetic material have at least approximately equal thermal expansion characteristics.

3. Apparatus according to claim 1, in which said circuit of said evaluation means comprises a Schmitt trigger circuit connected to said coil.

4. Apparatus according to claim 2, in which said circuit of said evaluating means comprises a Schmitt trigger circuit connected to said coil.

* * * * *